United States Patent
Chopade et al.

(10) Patent No.: US 9,909,056 B2
(45) Date of Patent: Mar. 6, 2018

(54) METHOD OF ALTERING CROSSLINK TIME OF DELAYED BORATE CROSSLINKERS

(71) Applicant: Halliburton Energy Services, Inc., Houston, TX (US)

(72) Inventors: Prashant D. Chopade, Kingwood, TX (US); Bianca Coria, Arlington, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/323,310

(22) PCT Filed: Aug. 6, 2014

(86) PCT No.: PCT/US2014/049956
§ 371 (c)(1),
(2) Date: Dec. 30, 2016

(87) PCT Pub. No.: WO2016/022112
PCT Pub. Date: Feb. 11, 2016

(65) Prior Publication Data
US 2017/0145294 A1    May 25, 2017

(51) Int. Cl.
E21B 43/22     (2006.01)
C09K 8/62      (2006.01)
E21B 43/26     (2006.01)
E21B 43/267    (2006.01)

(52) U.S. Cl.
CPC ............ C09K 8/62 (2013.01); E21B 43/26 (2013.01); E21B 43/267 (2013.01)

(58) Field of Classification Search
CPC .......... C09K 8/685; C09K 8/68; C09K 8/805; E21B 43/267; E21B 43/26; E21B 43/261; E21B 43/25; E21B 43/16
See application file for complete search history.

(56) References Cited

U.S. PATENT DOCUMENTS

| | | | |
|---|---|---|---|
| 5,310,489 | A | 5/1994 | Sharif |
| 6,024,170 | A | 2/2000 | McCabe et al. |
| 2006/0032636 | A1 | 2/2006 | Lord et al. |
| 2010/0048429 | A1 | 2/2010 | Dobson, Jr. et al. |

FOREIGN PATENT DOCUMENTS

EP    0805260 B1    6/2003

OTHER PUBLICATIONS

Kunkul, Asim et al., Dissolution Kinetics of Ulexite in Ammonium Sulfate Solutions, Ind. Eng. Chem. Res. 2003, 42, pp. 982-986, published on Web Jan. 30, 2003.
Demirkiran, N. et al., Dissolution Kinetics of Ulexite Prepared Under Different Calcination Temperatures, Bazilian Journal of Chemical Engineering, vol. 25, No. 04, pp. 751-758, Oct.-Dec. 2008.
Demirkiran, N. et al., Dissolution of Ulexite in Ammonium Carbonate Solutions, Theoretical Foundations of Chemical Engineering, vol. 45, No. 1, pp. 114-119, Jul. 14, 2009.
International Search Report and Written Opinion dated Apr. 27, 2015 in related international application PCT/US14/049956, Halliburton Energy Services, Inc.

*Primary Examiner* — Zakiya W Bates
(74) *Attorney, Agent, or Firm* — McAfee & Taft

(57) ABSTRACT

A method and composition relating to treating subterranean wells and particularly relating to treating subterranean wells with crosslinked well treatment fluids is shown. The method and composition involve the use of a ulexite with a crosslinking accelerator selected from the group consisting of ammonium salts.

18 Claims, 2 Drawing Sheets

METHOD OF ALTERING CROSSLINK TIME OF DELAYED BORATE CROSSLINKERS

CROSS RELATED

This application claims the benefit of previously filed International Application PCT/US2014/49956 filed Aug. 6, 2014.

FIELD

The present invention relates to treating subterranean wells and particularly relates to treating subterranean wells with crosslinked well treatment fluids.

BACKGROUND

High viscosity aqueous crosslinked gels are used in a variety of operations and treatments carried out in oil and gas wells. Such operations and treatments include, but are not limited to, well completion operations, fluid loss control treatments, production stimulation treatments, formation permeability conformance operations and treatments to reduce water production.

An example of a production stimulation treatment utilizing a high viscosity crosslinked gelled fluid is hydraulic fracturing. In hydraulic fracturing treatments, the high viscosity fluid is utilized as a fracturing fluid and also carries particulate propping agents, e.g., sand, into the fractures formed. That is, the fracturing fluid is pumped through the wellbore into a formation to be stimulated at a rate and pressure such that fractures are formed and extended in the formation. The propping agent is suspended in the fracturing fluid so that it is deposited in the fractures when the gel is broken and returned to the surface. The propping agent functions to prevent the formed fractures from closing whereby conductive channels are formed through which produced fluids can flow to the wellbore.

Borate ion has long been used as a crosslinking agent for forming high viscosity crosslinked gelled aqueous well treating fluids. Various sources of borate have been utilized including boric acid, borax, sodium tetraborate, slightly water soluble borates such as ulexite, and other proprietary compositions comprised of boric acid and dimers and trimers of borate ions. Different borate ion sources have different properties which affect their use as crosslinking agents. For example, the rate of crosslinking can vary depending on the borate ion source used.

Instant crosslinkers provide for quick increase of viscosity or gelling of the treatment fluid. Delayed crosslinkers provide a slower gelling of the treatment fluid. Depending on the delayed crosslinker, it can take on the order of a minute, several minutes or even an hour or more for the viscosity to increase to suitable levels ("gelling time"). Ulexite has been used as a delayed crosslinker. Depending upon its carrier fluid, it can have a gelling time on the order of about 15 minutes to about an hour. For some well operations requiring a delayed crosslinker, this gelling time is too long.

DETAILED DESCRIPTION

Figure 1:
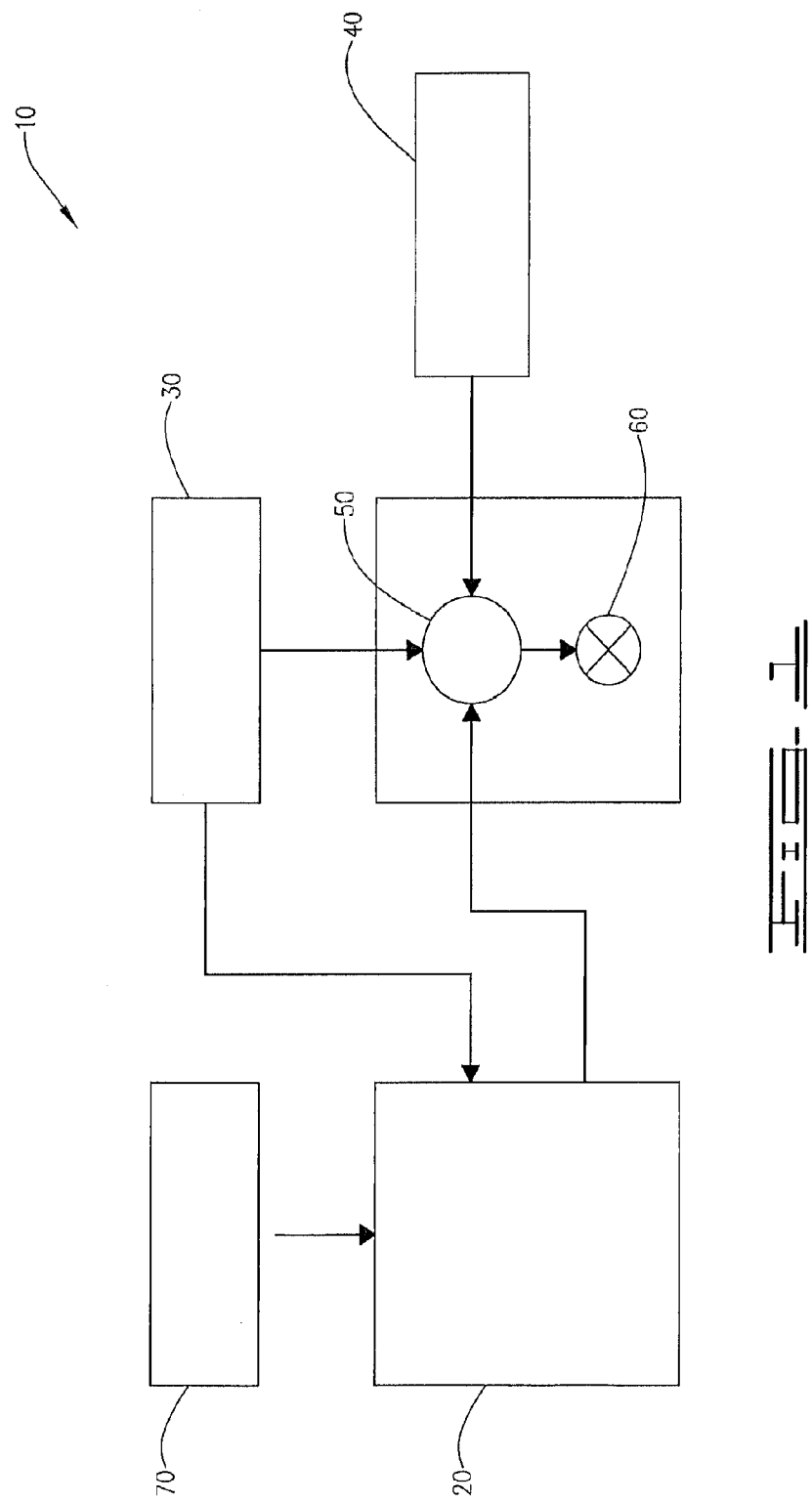
FIG. 1 is a diagram illustrating an example of a fracturing system that may be used in accordance with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor (or gelling agent) with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
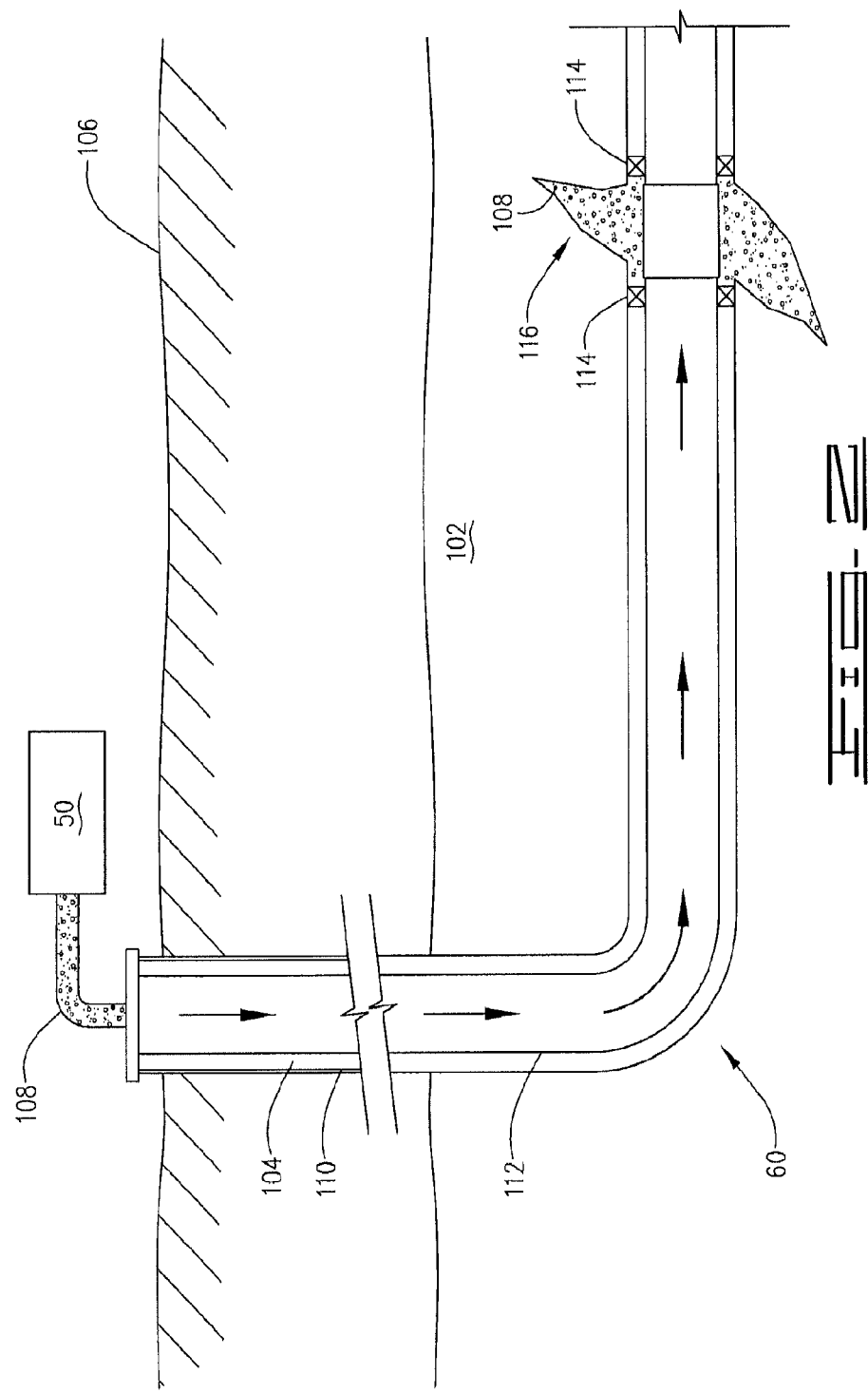
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled a work string 112 to pump the fracturing fluid 108 into the wellbore 104. The working string 112 may include coiled tubing, jointed pipe, and/or other structures that allow fluid to flow into the wellbore 104. The working string 112 can include flow control devices, bypass valves, ports, and or other tools or well devices that control a flow of fluid from the interior of the working string 112 into the subterranean zone 102. For example, the working string 112 may include ports adjacent the wellbore wall to communicate the fracturing fluid 108 directly into the subterranean formation 102, and/or the working string 112 may include ports that are spaced apart from the wellbore wall to communicate the fracturing fluid 108 into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Turning now to one embodiment, there is provided an improved ulexite crosslinking composition for use in a gelling treatment fluid for an oil and gas reservoir. The ulexite crosslinking compositions include a ulexite, a carrier fluid, and a crosslinking accelerator. The current ulexite crosslinking compositions provide for a reduced crosslinking or gelling time for a gelling agent without application of elevated temperatures or the addition of instant crosslinking compounds.

The carrier fluid can be an aqueous carrier fluid or a hydrocarbon based carrier fluid, as are known in the art. If hydrocarbon based, the carrier fluid can be, for example, a non-volatile hydrocarbon liquid such as hexane, heptane or octane; an aromatic compound such as benzene, toluene or xylene; mixtures of hydrocarbon compounds such as diesel oil, kerosene, mineral oil and lubricating oil; and vegetable oils such as canola, grape seed oil and the like. The carrier fluid is generally included in the crosslinking compositions in an amount in the range of from about 40% to about 55% by weight of the composition, and preferably from about 45% to about 50%.

Ulexite is added to the carrier fluid in an amount in the range of from about 25% to about 50% by weight of the composition, preferably in an amount of from about 35% to about 45%. Additionally, one or more suspending agents can be added to aid in suspending the ulexite in the carrier fluid. For example, organophillic clay can be used as a suspending agent. If used, the suspending agent can be present in an amount from about 0.5% to about 4% by weight of the composition.

An ammonium salt is used as a crosslinking accelerator. It has been found that certain ammonium salts are beneficial for decreasing the gelling time when ulexite is used as a gelling agent or crosslinker. The ammonium salt can generally be any ammonium salt that speeds up the crosslinking of the gelling agent (as described below) and, hence, results in a decrease gelling time for the treatment fluid. In other words, the ammonium salt results in a reduction in the time required for the ulexite to crosslink the gelling agent. Typically, a suitable ammonium salt can reduce the gelling time by at least 20%, can reduce the gelling time by at least 30% or at least 40% and, preferably, can reduce the gelling time by at least 50% over use of a ulexite crosslinker without the ammonium salt. To achieve such gelling time reductions, the ammonium salt can be present in an amount of at least about 0.001% by weight of the ulexite crosslinking composition, can be present in an amount of at least 0.002% by weight of the ulexite crosslinking composition, and can be present in an amount of at least 0.004% by weight of the ulexite crosslinking composition. Typically, the ammonium salt can be present in an amount of no more than about 1% by weight of the ulexite crosslinking composition, can be present in an amount of no more than about 0.5% by weight of the ulexite crosslinking composition and can be no more than 0.01% by weight of the ulexite crosslinking composition. Accordingly, suitable ranges for the ammonium salt can be from about 0.001% to about 1% by weight of the ulexite crosslinking composition, can be from 0.002% to 0.5% and preferably can be from 0.004% to 0.01%. Exemplary ammonium salts include ammonium sulfate, ammonium chloride, ammonium chloride, ammonium bromide, ammonium nitrate, ammonium fluoride, and ammonium carbonate. Particularly useful ammonium salts can be selected from the group consisting of ammonium sulfate, ammonium chloride and mixtures thereof.

While not wishing to be bound by theory, it is believed that the ammonium-salt crosslinking accelerator reacts with the ulexite to produce boric acid such that the crosslinking time for a gelling treatment fluid is reduced while still providing for a delayed crosslinking. An exemplary reaction between ulexite and ammonium sulfate is:

$$Na_2O \cdot 2CaO \cdot 5B_2O \cdot nH_2O_{(s)} + 3(NH_4)_2SO_{4(s)} + (12-n)H_2O \rightarrow Na_2SO_{4(aq)} + 2CaSO_{4(aq)} + 6NH_{3(aq)} + 10H3BO_{3(aq)}$$

Accordingly, when the ammonium salt is added to the ulexite containing carrier fluid, a reaction occurs to produce a delayed crosslinking composition comprising a carrier fluid, boric acid, a calcium salt, a sodium salt and ammonia. In some embodiments, the ammonium salt can be present in an amount sufficient to react with all the ulexite in the ulexite crosslinking composition. In more preferred embodiments, the ammonium salt can be present in amount sufficient to react with less than all of the ulexite present in the ulexite crosslinking composition. The portion of unreacted ulexite can be 10% to 90% of the ulexite present in the ulexite crosslinking composition. Thus, there can be a surplus of the ulexite such that when the ammonium salt is added to the ulexite containing carrier fluid, a reaction occurs to produce a delayed crosslinking composition comprising a carrier fluid, boric acid, a calcium salt, a sodium salt, ammonia and ulexite.

The ulexite crosslinking composition can be used in a method of treating a subterranean zone penetrated by a wellbore. The method comprises preparing a treating fluid containing a gelling fluid and the ulexite crosslinking composition. Typically, this preparing a treatment fluid comprises introducing the ulexite crosslinking composition into the gelling treatment fluid at the well site just prior to introduction into the well. After the treating fluid is prepared, it is pumped into the subterranean zone in a manner consistent with the downhole operation being performed.

Suitable gelling fluids comprise a gelling agent in an aqueous fluid. Suitable aqueous fluids include fresh water, salt water, brine, formation brine, seawater, or any other aqueous fluid that, preferably, does not adversely interact with the other components used in accordance with this invention or with the subterranean formation. In some embodiments, the aqueous fluid may be present in the gelling fluids in an amount in the range from about 5% to 99.99% by volume of the gelling fluid.

Suitable gelling agents for aqueous based fluids include water-soluble polymers. Such gelling agents include natural and synthetic polymers bearing borate crosslinkable functional groups. Synthetic polymers, such as polyacrylamides and polyacrylates, can be used as the gelling agent. Natural polymers include high-molecular weight polysaccharides, such as cellulose, polysaccharides composed of mannose and galactose sugars (galactomannans), and polysaccharides composed of mannose and glucose. For example, gelling agents can include cellulose, galactomannans, and xanthan and can include derivatives thereof. Of the various galactomannan gelling agents which can be utilized, guar and guar derivatives are preferred. Guar derivatives, for example, include hydropropyl guar (HPG), carboxymethyl guar (CMG), carboxymethylhydropropyl guar (CMHPG) and hydroxyethylated guar (HEG). Cellulose derivatives, for example, include hydroxyethylcellulose (HEC), hydroxypropylcellulose (HPC), carboxymethyl cellulose (CMC) and carboxymethylhydroxyethylcellulose (CMHEC). Preferred are galactomannan gelling agents selected from the group consisting of guar, hydroxyethylguar, hydroxypropylguar, carboxymethylguar, carboxymethylhydroxyethylguar, and mixtures thereof.

Typically, the concentration of gelling agent in the aqueous fluid will depend on the desired viscosity. Often such concentrations are from about 5 lb/1000 gal of aqueous fluid to about 100 lb/1000 gal of aqueous fluid.

The ulexite crosslinking composition can be added to gelling fluid in an amount from about 0.2 gal/1000 gal of the aqueous fluid present in the treatment fluid to about 8 gal/1000 gal of the aqueous fluid. More typically, the ulexite crosslinking composition concentration can be from 0.5 gal/1000 gal of the aqueous fluid to 5 gal/1000 gal of the aqueous fluid.

The crosslinking accelerator is present in the treatment fluid in a concentration sufficient to reduce the time required to reduce the gelled treatment fluid to be crosslinked by at least 20%, at least 30%, at least 40% or at least 50%. To achieve this, the crosslinking accelerator can generally be present in the treatment fluid in a concentration from about 0.1 lb/1000 gal of the aqueous fluid present in the treatment fluid to about 4 lb/1000 gal of the aqueous fluid. More typically, the crosslinking accelerator concentration can be from 0.2 lb/1000 gal of aqueous fluid to 3 lb/1000 gal of the aqueous fluid. Most preferably, the crosslinking accelerator concentration can be from about 0.4 lb/1000 gal of the aqueous fluid to about 1 lb/1000 gal of the aqueous fluid.

For example, a suitable ulexite crosslinking composition can have a crosslinking accelerator present in an amount from 0.0001% to 0.5% by weight carrier fluid. This ulexite crosslinking composition can be added to a gelling fluid having a gelling agent concentration of from 8 lb/1000 gal to 100 lb/1000 gal of aqueous fluid treatment. The ulexite crosslinking composition can be added at a concentration of 0.2 gal/1000 gal to 8 gal/1000 gal of aqueous fluid. The resulting composition will reach a viscosity of at least 400 cP in less than 30% of the time of a similar treating fluid which does not have the crosslinking accelerator.

In certain embodiments, the treatment fluids also may optionally comprise salts, pH control additives, surfactants, breakers, bactericides, fluid loss control additives, stabilizers, chelants, scale inhibitors, paraffin inhibitors, asphaltene inhibitors, mutual solvents, solvents, corrosion inhibitors, hydrate inhibitors, clay stabilizers, relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

Also, for some downhole operations, the treatment fluids can contain proppants as are known in the art. The proppant type can be sand, intermediate strength ceramic proppant, sintered bauxites and other materials known to the industry. Any of these base propping agents can further be coated with a resin to potentially improve the clustering ability of the proppant. In addition, the proppant can be coated with resin or a proppant flowback control agent such as fibers, for instance, can be simultaneously pumped. By selecting proppants having a contrast in one of such properties such as density, size and concentrations, different settling rates will be achieved.

EXAMPLES

The following examples are provided to illustrate the inventive process. The examples are not intended and should not be taken to limit, modify or define the scope of the present invention in any manner.

In the below controls and examples, an aqueous gelling fluid containing 30 lb/gal of guar gum and having a pH of 10 was used.

Control 1:

To the aqueous gelling fluid, a sample of a first ulexite crosslinker composition was added to a concentration of 0.9 gal/1000 gal. The first ulexite crosslinker composition was composed of ulexite in a hydrotreated light petroleum distillate. The viscosity profile on Chandler 5550 viscometer was measured at room temperature at a shear rate of 40 s$^{-1}$. The results are record in Table 1 below.

Example 1

60 mg ammonium sulfate powder was added to a 900 μL sample of the first ulexite crosslinking composition. The resulting mixture was added to sufficient aqueous gelling fluid to achieve a ulexite crosslinker concentration of 0.9 gal/1000 gal. The viscosity profile on Chandler 5550 viscometer was measured at room temperature at a shear rate of 40 s$^{-1}$. The results are record in Table 1 below.

Control 2:

To the aqueous gelling fluid, a sample of a second ulexite crosslinker composition was added to a concentration of 0.9 gal/1000 gal. The second ulexite crosslinker composition was composed of ulexite in a hydrotreated light petroleum distillate. The viscosity profile on Chandler 5550 viscometer was taken at room temperature at a shear rate of 40 s$^{-1}$. The results are record in Table 1 below.

Example 2

60 mg ammonium sulfate powder was added to 900 μL sample of the second ulexite crosslinker composition. The resulting mixture was added to sufficient aqueous gelling fluid to achieve a ulexite crosslinker concentration of 0.9 gal/1000 gal. The viscosity profile on Chandler 5550 viscometer was taken at room temperature at a shear rate of 40 s$^{-1}$. The results are record in Table 1 below.

TABLE 1

| Composition | Time Required to Reach 500 cP |
|---|---|
| Control 1 | 55 min |
| Example 1 | 35 min |
| Control 2 | 15 min |
| Example 2 | 5 min |

As can be seen from Table 1, there was a reduction in the time required to crosslink the gaur gum to achieve a viscosity of 500 cP for each of the samples using ammonium sulfate. Thus, by using an ammonium salt as a crosslinking accelerator, the delay time for ulexite crosslinkers can be shorten.

Exemplary embodiments that are in accordance with the above description include a method of treating a subterranean zone penetrated by a wellbore comprising the steps of:
preparing a treating fluid comprising:
a gelling fluid;
an ulexite; and
a crosslinking accelerator selected from the group consisting of ammonium salts and mixtures thereof wherein the crosslinking accelerator is present in amount sufficient to reduce the time required for the ulexite to crosslink the gelling treatment fluid; and
pumping the treating fluid into the zone.

In another aspect, the step of preparing a treatment fluid can comprise introducing a carrier fluid containing the ulexite and the crosslinking accelerator into the gelling fluid. Accordingly, the method can further comprise, reacting the ulexite with the crosslinking accelerator to produce a delay crosslinking composition comprising the carrier fluid, boric acid, a calcium salt, a sodium salt and ammonia.

In yet another aspect, the gelling treatment fluid can contain a gelling agent and an aqueous fluid. The gelling agent can be present in the treatment fluid in an amount from 5 lb/1000 gal to 100 lb/1000 gal of aqueous fluid. The ulexite can be added to the gelling agent as a mixture of ulexite and a carrier fluid. The mixture can be present in the treatment fluid in an amount from 0.2 gal/1000 gal to 8 gal/1000 gal of aqueous fluid. The crosslinking accelerator can be present in the treatment fluid in an amount from 0.1 lb/1000 gal to 4 lb/1000 gal of aqueous fluid. Alternatively, the crosslinking accelerator can be present in an amount from 0.2 lb/1000 gal to 3 lb/1000 of aqueous fluid.

In another exemplary embodiment, a method of treating a subterranean zone penetrated by a wellbore is provided. The method comprises the steps of:
mixing a carrier fluid, ulexite and a crosslinking accelerator selected from the group consisting of ammonium salts and mixtures thereof;
reacting the ulexite with the crosslinking accelerator to produce a delay crosslinking composition comprising the carrier fluid, boric acid, a calcium salt, a sodium salt and ammonia;
adding the delay crosslinking composition to a treating fluid comprising an aqueous fluid and a gelling agent; and
pumping the treating fluid into the zone.

In the above methods, the crosslinking accelerator can be present in amount sufficient to reduce the time required for the gelling treatment fluid to be crosslinked by 20% or more. Alternatively, the crosslinking accelerator can be present in an amount sufficient to reduce the time required for the gelling treatment fluid to be crosslinked by 40% or more.

Also in the above methods, the crosslinking accelerator can be selected from the group consisting of ammonium sulfate, ammonium chloride, ammonium chloride, ammonium bromide, ammonium nitrate, ammonium fluoride, ammonium carbonate and mixtures thereof. Further, the crosslinking accelerator can be ammonium sulfate. Alternatively, the crosslinking accelerator can be ammonium chloride.

Additionally, in the above methods the gelling agent can be selected from the group consisting of cellulose, galactomannans, xanthan, derivatives thereof and mixtures thereof. Further, the gelling agent can be selected from the group consisting of guar, hydroxyethylguar, hydroxypropylguar, carboxymethylguar, carboxymethylhydroxyethylguar, and mixtures thereof.

In another exemplary embodiment, a ulexite crosslinking composition for use in a gelling treatment fluid for an oil and gas reservoir comprises a ulexite, a carrier fluid, and a crosslinking accelerator selected from the group consisting of ammonium salts and mixtures thereof. The crosslinking accelerator is present in amount sufficient to reduce the time required for the ulexite to crosslink the gelling treatment fluid.

In further exemplary embodiment, a delayed crosslinking composition for use in a gelling treatment fluid for an oil and gas reservoir comprises a carrier fluid, boric acid, a calcium salt, a sodium salt and ammonia. The delayed crosslinking composition can further comprise ulexite. The boric acid, a calcium salt, a sodium salt and ammonia can be formed by reacting ulexite with an ammonium salt in the carrier fluid.

In the above compositions, the crosslinking accelerator can be selected from the group consisting of ammonium sulfate, ammonium chloride ammonium chloride, ammonium bromide, ammonium nitrate, ammonium fluoride, ammonium carbonate and mixtures thereof. Further, the crosslinking accelerator can be ammonium sulfate. Alternatively, the crosslinking accelerator can be ammonium chloride.

Also in the above compositions, the carrier fluid can be an aqueous-based carrier fluid. Alternatively, the carrier fluid can be a hydrocarbon-based carrier fluid.

In the above compositions, the ulexite can be present in the mixture in an amount from 25% to 50% by weight of the composition and the crosslinking accelerator can be present in the mixture in an amount from 0.001% to 1% by weight of the composition. Alternatively, the crosslinking accelerator can be present in an amount from 0.004% to 0.01% by weight of the composition.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a subterranean zone penetrated by a wellbore comprising the steps of:
   preparing a treating fluid comprising:
      a gelling fluid;
      a ulexite crosslinking composition comprising an ulexite, a carrier fluid and a crosslinking accelerator, wherein the crosslinking accelerator is selected from the group consisting of ammonium salts and mixtures thereof, and wherein said crosslinking accelerator is present in amount from 0.001% to less than 0.01% by weight of the ulexite crosslinking composition so as to be sufficient to reduce the time required for said ulexite to crosslink said gelling treatment fluid; and
   pumping said treating fluid into said zone.

2. The method of claim 1, wherein said crosslinking accelerator is present in amount sufficient to reduce the time required for said gelling treatment fluid to be crosslinked by 20% or more.

3. The method of claim 1, wherein said crosslinking accelerator is present in an amount sufficient to reduce the time required for said gelling treatment fluid to be crosslinked by 40% or more.

4. The method of claim 1, wherein said step of preparing a treatment fluid comprises introducing a carrier fluid containing said ulexite and said crosslinking accelerator into said gelling fluid.

5. The method of claim 4, further comprising reacting said ulexite with said crosslinking accelerator to produce a delay crosslinking composition comprising said carrier fluid, boric acid, a calcium salt, a sodium salt and ammonia.

6. The method of claim 5, wherein said crosslinking accelerator is selected from the group consisting of ammonium sulfate, ammonium chloride, ammonium bromide, ammonium nitrate, ammonium fluoride, ammonium carbonate and mixtures thereof.

7. The method of claim 1, wherein said crosslinking accelerator is selected from the group consisting of ammonium sulfate, ammonium chloride, ammonium bromide, ammonium nitrate, ammonium fluoride, ammonium carbonate and mixtures thereof.

8. The method of claim 1, wherein said crosslinking accelerator is ammonium sulfate.

9. The method of claim 1, wherein said crosslinking accelerator is ammonium chloride.

10. The method of claim 1, wherein said ulexite is present in said ulexite crosslinking composition in an amount from 25% to 50% by weight of the ulexite crosslinking composition.

11. The method of claim 10, wherein said gelling agent is selected from the group consisting of cellulose, galactomannans, xanthan, derivatives thereof and mixtures thereof.

12. The method of claim 10, wherein said gelling agent is selected from the group consisting of guar, hydroxyethylguar, hydroxypropylguar, carboxymethylguar, carboxymethylhydroxyethylguar, carboxymethyihydroxypropylguar and mixtures thereof.

13. A ulexite crosslinking composition for use in a gelling treatment fluid for an oil and gas reservoir comprising a ulexite, a carrier fluid, and a crosslinking accelerator selected from the group consisting of ammonium salts and mixtures thereof, wherein said crosslinking accelerator is present in amount from 0.001% to less than 0.01% by weight of the ulexite crosslinking composition so as to be sufficient to reduce the time required for said ulexite to crosslink said gelling treatment fluid.

14. The ulexite crosslinking composition of claim 13, wherein said crosslinking accelerator is selected from the group consisting of ammonium sulfate, ammonium chloride, ammonium bromide, ammonium nitrate, ammonium fluoride, ammonium carbonate and mixtures thereof.

15. The ulexite crosslinking composition of claim 13, wherein said crosslinking accelerator is ammonium sulfate.

16. The ulexite crosslinking composition of claim 13, wherein said crosslinking accelerator is ammonium chloride.

17. The ulexite crosslinking composition of claim 13, wherein said ulexite is present in said mixture in an amount from 25% to 50% by weight of said composition.

18. The ulexite crosslinking composition of claim 17, wherein said crosslinking accelerator is present in an amount from 0.004% to less than 0.01% by weight of said composition.

* * * * *

UNITED STATES PATENT AND TRADEMARK OFFICE
CERTIFICATE OF CORRECTION

PATENT NO. : 9,909,056 B2
APPLICATION NO. : 15/323310
DATED : March 6, 2018
INVENTOR(S) : Prashant D. Chopade et al.

Page 1 of 1

It is certified that error appears in the above-identified patent and that said Letters Patent is hereby corrected as shown below:

In the Claims

In Claim 12, Line 4, delete "carboxymethyihydroxypropylguar" and insert --carboxymethylhydroxypropylguar-- therefor.

Signed and Sealed this
Seventeenth Day of April, 2018

Andrei Iancu
*Director of the United States Patent and Trademark Office*